Figure 4:
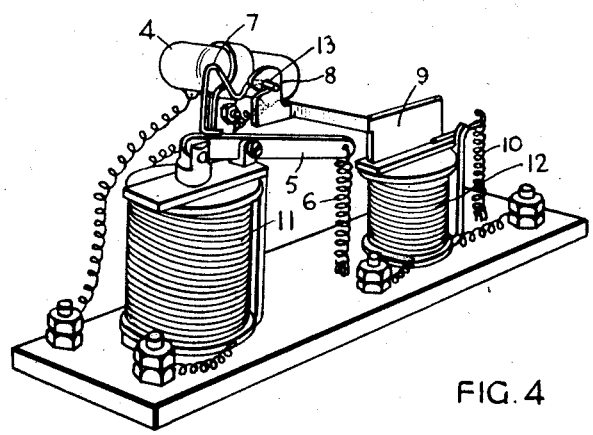

Oct. 7, 1941.  C. HIGGINS  2,257,797
ELECTRIC PROTECTIVE DEVICE FOR LUMINOUS ELECTRIC DISCHARGE TUBE SYSTEMS
Filed May 23, 1939  2 Sheets-Sheet 1
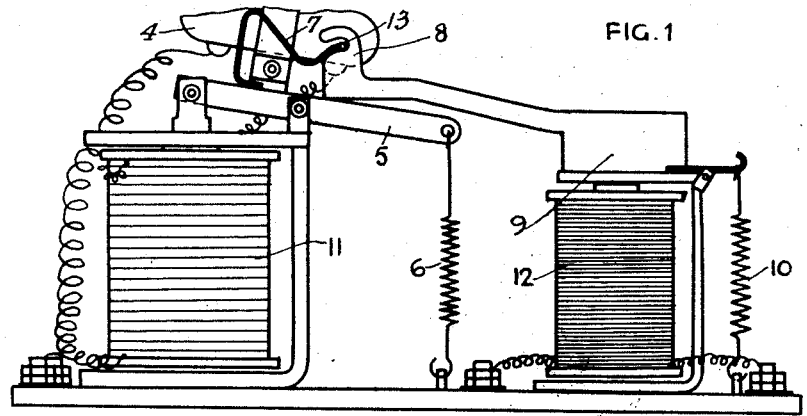
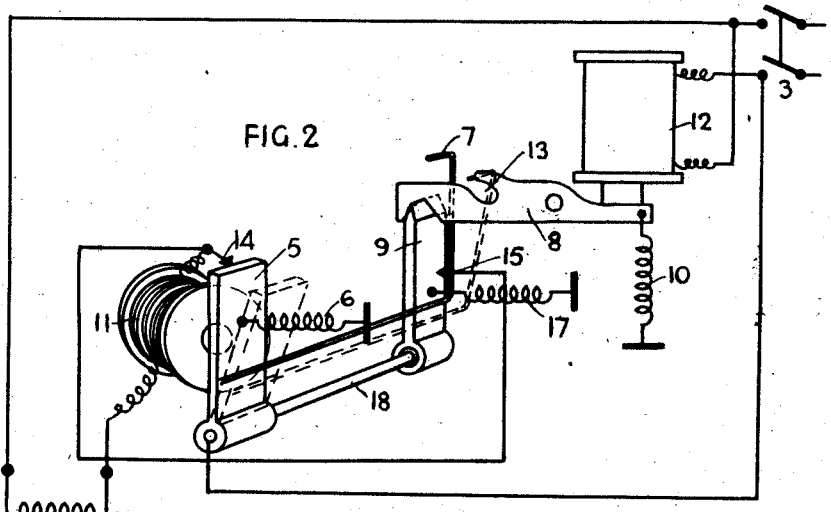
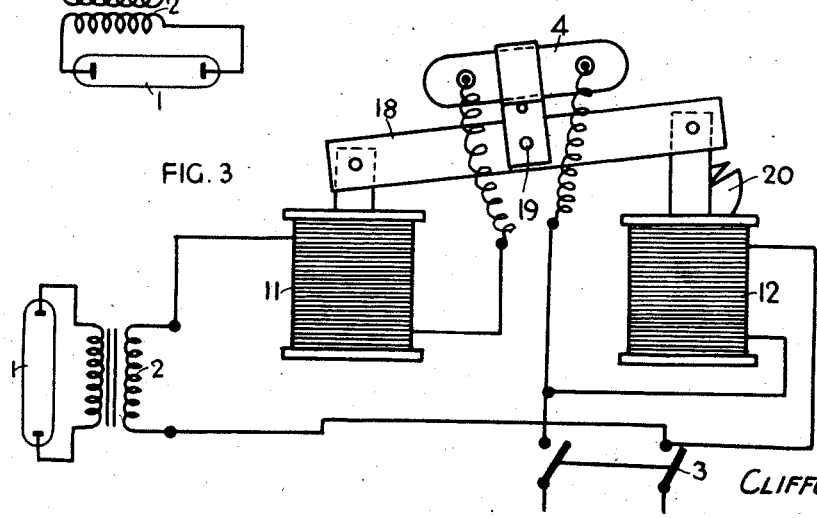
INVENTOR
CLIFFORD HIGGINS
BY
Attorney Oct. 7, 1941.  C. HIGGINS  2,257,797
ELECTRIC PROTECTIVE DEVICE FOR LUMINOUS ELECTRIC DISCHARGE TUBE SYSTEMS
Filed May 23, 1939  2 Sheets-Sheet 2

INVENTOR
CLIFFORD HIGGINS
BY
ATTORNEY

Patented Oct. 7, 1941

2,257,797

UNITED STATES PATENT OFFICE 2,257,797

ELECTRIC PROTECTIVE DEVICE FOR LUMINOUS ELECTRIC DISCHARGE TUBE SYSTEMS

Clifford Higgins, Richmond, England, assignor to Claude-General Neon Lights Limited, London, England Application May 23, 1939, Serial No. 275,205
In Great Britain May 24, 1938

14 Claims. (Cl. 176—124)

This invention relates to electric protective arrangements for effecting protection of an electric circuit in which, in the event of a fault, the current in the circuit may decrease but the circuit is not fully opened. Such circumstances are met in the event of a fault in a circuit including one or more luminous electric discharge tubes or lamps, more particularly luminous electric discharge tubes or lamps for operation on a high voltage. In such a system the occurrence of an insulation breakdown on the high voltage side, for example an earth fault to one electrode conductor may cause a reduction in the actual current flowing in the circuit.

The object of the present invention is to provide means whereby protection may be effected, in the event of a fault causing an effect of the kind to which reference is made above, by the de-energisation of the circuit and the ensuring that the circuit cannot again be energised at least until some manual control has been effected.

According to the present invention, a device for effecting protection of an electric circuit comprises a first relay means responsive to current in said circuit and adapted to open said circuit in the event of a decrease of current in said circuit due to the occurrence of a fault, a second relay means responsive to voltage across said circuit, and interlock means between said first relay and said second relay such that in the event of a fault causing release of said first relay means, further operation of said first relay means can only be effected after a manual resetting at least of said interlock means.

Three arrangements of protective relays for a luminous electric discharge tube system, in accordance with the invention will now be described by way of example with reference to the accompanying drawings, of which Figures 1, 4 and 5 refer to one embodiment and Figures 2 and 3 refer to the other two embodiments respectively.

In Figure 1 the system comprises, for example, a high voltage luminous electric discharge tube or the like (not shown in Figure 1) fed from the secondary of a high voltage step-up transformer (not shown in Figure 1), the primary winding of which transformer is connected to a supply of normal mains voltage through a manually operable switch (also not shown in Figure 1) and the protective device in accordance with the invention.

The device includes a mercury switch 4 which is adapted to be operated by a solenoid relay, the armature 5 of the solenoid relay having the mercury switch rigidly connected thereto and being biased by means of a tensioned spring 6 to its deenergised position, in which position the mercury switch is open. The armature of the solenoid relay also carries a resilient interlock arm 7 which is arranged to cooperate with a rigid interlock cam 8 arranged at one end of the armature 9 of a second solenoid relay. The armature of the second solenoid relay is also biased to the "off" or de-energised position by a tensioned spring 10. The winding 11 of the first solenoid relay, and the mercury switch are connected in series with the transformer primary and the manually operable switch while the winding 12 of the second solenoid relay is connected across the supply through the manually operated switch and is thus in parallel with the winding of the first solenoid relay and the transformer primary.

The interlock arm 7 attached to the first relay armature is arranged to bear against the projection 14 on the interlock cam 8 when the second relay is de-energised and is under the influence of the biasing spring 10, the projection being of such a shape that, when both relays are de-energised by opening the main switch, the first relay is locked in its operated position and the mercury switch is prevented from opening. When the second relay is energised, a dwell 13, formed in the cam surface, is presented to the interlock arm and the interlock arm is latched into said dwell under the action of the spring biasing said first-mentioned relay.

In operation, assuming the system to be free from faults, the manually operable switch is closed and simultaneously two parallel circuits are completed, the one through the winding 12 of the second mentioned relay, and the other through the winding 11 of the first mentioned relay, the closed mercury switch 4 and the transformer primary. (This is only possible when the interlock arm and the cam are not latched together).

If now a fault occurs which leads to a decrease of current in the primary circuit of the transformer, sufficient to cause a release of the first relay, then the interlock arm is latched into the dwell on the cam and the circuit through the transformer primary and relay winding is interrupted by the opening of the mercury switch.

The mercury switch cannot now be reclosed until the first relay has been released from the interlock and this can only be effected by first opening the manually operated switch to release the second relay and then effecting a manual resetting of the interlock arm 7 and cam 8 of the first and second relays respectively by moving the armature of the first relay by hand to its energised position whereby the interlock arm 7 engages the projection 14 on the cam and the mercury switch is reclosed.

Figure 5:
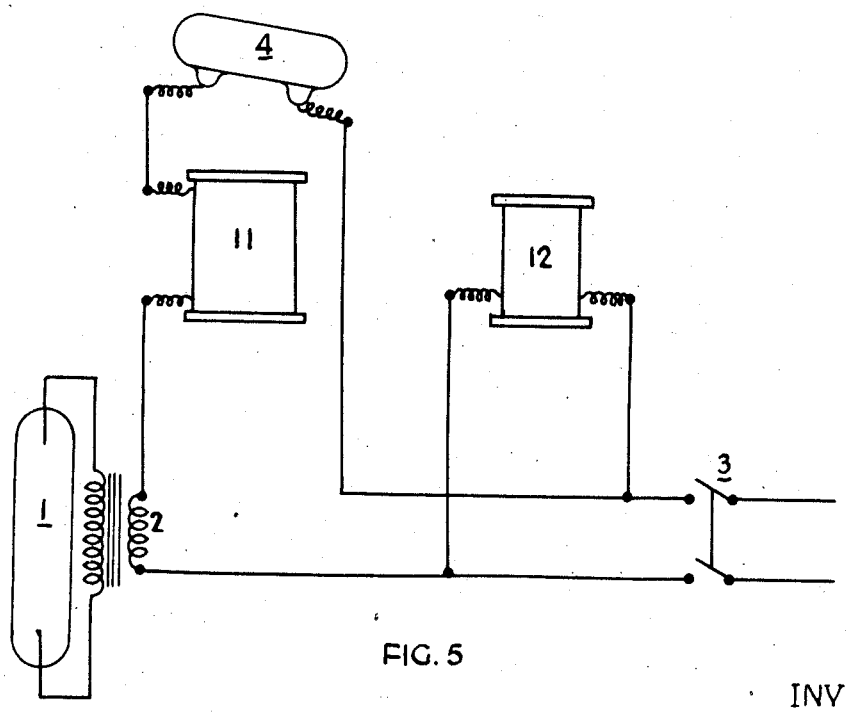

Figure 4 shows a perspective view of this embodiment, and Figure 5 shows diagrammatically the electrical connections in this embodiment.

In Figure 5, a high voltage luminous electric discharge tube 1 is fed from the secondary of a high voltage step-up transformer 2, one terminal of the primary winding of the said transformer being connected to a supply of normal mains voltage through the coil 11 of the first relay means, the mercury switch 4 and one pole of a manually operated two-pole switch 3, and the other terminal of the primary winding being connected directly to the other pole of the manually operated switch 3. The coil 12 of the second relay means is connected across the poles of said switch 3.

Another embodiment of a protective relay in accordance with the invention is represented in Figure 2. In this arrangement, a solenoid 11 is connected in series with a transformer 2 feeding a discharge tube 1 and a pair of spring contacts 14 and 15. The free end of the transformer primary is connected to one side of the mains and the contacts 14 and 15 cooperate with contacts fixed on an armature 5 and a lever 9 respectively, both the armature and the lever being mounted upon a common shaft 18 but being capable of movement independent of each other. The shaft 18 is connected to the other side of the mains. The pair of contacts 14 and 5 and 15 and 9 are thus connected in parallel, and either contact, when closed, connects the series circuit so formed to the supply mains through a main switch 3. The solenoid 11 operates upon an armature 5 to close the contacts 14 and 5 in opposition to the pull of a biasing spring 6. A solenoid 12, connected across the mains controls an armature 8 which is biased to its inoperated position by a spring 10. This armature has an indent 19 which is adapted to cooperate with the lever 9 in such a way that, when the solenoid 12 is energised, pressure exerted on the end of the lever 9 by the sloping sides of the indent 19 moves the lever 9, which is biased by a spring 17 towards the closed position of the contacts 15 and 9, to cause the contacts 15 and 9 to be moved to the open position and locked there. Thus when the system is free from faults and the main switch is closed the solenoids operate upon their respective armatures to close the contacts 14 and 5 and open the contacts 15 and 9. On closure of contacts 14 and 5 the circuit through the load will be completed.

On the occurrence of a fault, which causes the load current to fall, the armature 5 is released, and the interlock bar attached to this armature engages with the armature 8 to prevent the latter returning to its released position when the main switch is opened. The contacts 15 and 9 are then locked in the open position with the result that the circuit through solenoid 11 and the load cannot be completed until these contacts have been reset manually by opening the main switch 3 and moving the armature 5 and its associated interlock bar 7 by hand to their operated position, thus releasing the armature 8 from engagement with the interlock bar 7.

A slot 13 is cut in the interlock bar 8 to accommodate the end of the interlock bar 7 when the armature 5 and the interlock bar are released simultaneously by opening the main switch 3.

Yet another arrangement of a protective relay in accordance with the invention is shown in Figure 3. A solenoid 11 is connected in series with a mercury switch 4 and a transformer 2 which feeds a discharge tube 1, the series circuit so formed being connected across the mains. The solenoid 11 cooperates with an armature 18 which is balanced about its centre point 19. A second solenoid 12, connected across the mains, cooperates with the other end of the armature 18. The armature is adapted to hold the mercury switch in the closed position when both solenoids are fully excited so that, when the armature is manually moved to the position in which the mercury switch is closed and a main switch 3 is closed, the circuit through the mercury switch 4 and the transformer 2 is completed.

On the occurrence of a fault which causes the load current to fall the armature 18 is released by the solenoid 11 and is moved to a position in which the mercury switch opens. In this position the projection 21 on the armature presses against the lower end of the trigger lock 20 so that the upper end of the said trigger lock engages in the dwell 22 and locks the armature in this position. Thus the load circuit cannot be completed until the trigger lock has been manually disengaged from the dwell.

I claim:

1. An electric circuit protective apparatus comprising current responsive means having an open circuit position and a closed circuit position, said means being constructed and arranged to assume said open circuit position when current flowing in a circuit falls below a predetermined value, and means responsive to the voltage across said circuit to lock said first named means in open circuit position while voltage is impressed across said circuit when the current in said circuit falls below said predetermined value.

2. An electric circuit protective apparatus comprising current responsive means having an open circuit position and a closed circuit position, said means being constructed and arranged to assume said open circuit position when current flowing in a circuit falls below a predetermined value, and means responsive to the voltage across said circuit to lock said first named means in open circuit position while voltage is impressed across said circuit when the current in said circuit falls below said predetermined value, said last named means being manually operable to release said first named means from open circuit locked position.

3. An electric circuit protective apparatus comprising current responsive means having an open circuit position and a closed circuit position, said means being constructed and arranged to assume said open circuit position when current flowing in a circuit falls below a predetermined value, and means responsive to the voltage across said circuit to lock said first named means in open circuit position while voltage is impressed across said circuit when the current in said circuit falls below said predetermined value, said last named means being adapted to maintain said first named means in open circuit locked position when voltage is removed from said circuit.

4. An electric circuit protective apparatus comprising current responsive means having an open circuit position and a closed circuit position, said means being constructed and arranged to assume an open circuit position when current flowing in a circuit falls below a predetermined value, means responsive to the voltage across said circuit, and interlocking means associated with said current responsive means and said voltage responsive means to lock said current responsive means in open circuit position while voltage is impressed across said circuit when the current in said circuit falls below said predetermined value, said interlocking means being manually operable to release said current responsive means from open circuit locked position and dispose said means in closed circuit position.

5. An electric circuit protective apparatus comprising current responsive means having an open circuit position and a closed circuit position, said means being constructed and arranged to assume an open circuit position when current flowing in a circuit falls below a predetermined value, means responsive to the voltage across said circuit, interlocking means associated with said current responsive means and said voltage responsive means to lock said current responsive means in open circuit position while voltage is impressed across said circuit when the current in said circuit falls below said predetermined value, said interlocking means being manually operable to release said current responsive means from open circuit locked position and dispose said means in closed circuit position, and means to maintain said circuit closed when current and voltage are simultaneously cut off from said circuit while said current responsive means is in closed circuit position.

6. An electric circuit protective apparatus as set forth in claim 4 wherein said current responsive means comprises a solenoid, an armature operable by said solenoid, a mercury switch attached to said armature and adapted to be series connected in said circuit and means to spring bias said armature toward an open circuit position, wherein said voltage responsive means comprises a second solenoid adapted to be connected across said circuit and a second armature operable by said second solenoid, and wherein said interlock means is carried by said second armature and comprises a cam constructed and arranged to interlock with an extension on said first named armature.

7. An electric circuit protective apparatus comprising a solenoid adapted to be connected in series in the circuit to be protected and to be inoperative below a predetermined value of current in said circuit, a pair of contacts connected in parallel with respect to each other and connected in series with said solenoid, an armature cooperating with said solenoid and adapted to close connection between one pair of said contacts, resilient means to urge said armature to a position in which it opens connection between said pair of contacts, a second solenoid connected across said circuit and cooperating with a second armature, an interlock bar operable by said second armature upon energization of said second solenoid to a position in which it opens connection between the other pair of said contacts, resilient means to urge said bar to a position in which it closes connection between said pair of contacts, a second interlock bar operable by said first named armature when said first named solenoid is rendered inoperative while said second solenoid is energized to lock said second interlock bar in position in which it opens connection between said second pair of contacts whereby when a fault occurs in said circuit causing the current to drop below said predetermined value, said apparatus will operate to be locked in a position in which it opens said circuit and said circuit will not be able to be closed until the apparatus is manually reset.

8. An electric circuit protective apparatus comprising a balanced pivoted armature, a mercury switch attached to said armature and adapted to be connected in series in the circuit to be protected, said armature being adapted to move from a position in which said switch closes said circuit to a position in which said switch opens said circuit, a pair of solenoids oppositely actuating said armature, one of said solenoids being adapted to be connected in series in said circuit and said other solenoid being adapted to be connected across said circuit, said solenoids being constructed and arranged to move said armature to open circuit position only when the current flowing through said circuit and said first named solenoid drops below a predetermined value while said other solenoid is energized and a trigger lock associated with said armature to lock said armature in open circuit position whereby said electric circuit cannot be closed until said armature has been manually adjusted.

9. A device for effecting protection of an electric circuit comprising, in combination, a first electromagnetic relay means, said first relay means having a winding which is adapted to carry at least part of the current in said circuit, a second electromagnetic relay means, said second relay means having a winding which is adapted to be connected in parallel with at least part of said circuit, switch contacts associated with said relay means and adapted to be connected in series with said circuit, and interlock means between said first and second relay means, said interlock means being adapted to lock said switch contacts in the closed position when both said relay means are deenergised and to lock said switch contacts in the open position when the current in said first relay means falls below a predetermined minimum value while, at the same time, said second relay means remains normally energised.

10. In combination, an electric circuit and a device for effecting protection of said circuit, said device comprising, in combination, a first electromagnetic relay means, said first relay means having a winding which carries at least part of the current in said circuit, a second electromagnetic relay means, said second relay means having a winding which is connected in parallel with at least part of said circuit, switch contacts in series with said circuit, said switch contacts being associated with said relay means, and interlock means between said first and second relay means, said interlock means being adapted to lock said switch contacts in the closed position when both said relay means are deenergized and to lock said switch contacts in the open position when the current in said circuit falls below a predetermined minimum value while, at the same time, the voltage across said circuit remains at substantially full value.

11. In combination, an electric circuit comprising a gaseous discharge tube arrangement, a transformer having primary and secondary terminals, said secondary terminals being connected across said gaseous discharge tube arrangement, a source of alternating current, one pole of said source being connected to one of said primary terminals, and a device for effecting protection of said circuit, said device comprising, in combination, a first electromagnetic relay means, said first relay means having a winding which is connected between the other pole of said source and the other primary terminal of said transformer, a second electromagnetic relay means, said second relay means having a winding which is connected across said source, switch contacts in series with said circuit, said switch contacts being associated with said relay means, and interlock means between said first and second relay means, said interlock means being adapted to lock said switch contacts in the closed position when both said relay means are deenergised and to lock said switch contacts in the open position when the current in said circuit falls below a predetermined minimum value while, at the same time, the voltage across said circuit remains at substantially full value.

12. A device for effecting protection of an electric circuit comprising, in combination, a first electromagnetic relay means, said first relay means comprising a first winding, a first armature and a first biassing means, said first winding being adapted to be connected in series with said circuit and being adapted, when fully energised, to move said first armature to operated position against the action of said first biassing means, a second electromagnetic relay means, said second relay means comprising a second winding, a second armature and a second biassing means, said second winding being adapted to be connected in parallel with said circuit and, when energised, to move said second armature to operated position against the action of said second biassing means, switch contacts adapted to be connected in series with said circuit, said switch contacts comprising a mercury switch so mounted upon said first armature that said switch is closed when said first armature is in operated position, and interlock means, said interlock means comprising a cam formed upon a projection on said second armature, said cam having an abutting surface and a dwell, said abutting surface being brought to bear against a projection on said first armature before said first armature has moved from operated position, when both windings are deenergised, said projection on said first armature latching into said dwell when the current in said first winding falls below a predetermined minimum value and the current in said second winding remains substantially at full value.

13. A device for effecting protection of an electric circuit comprising, in combination, a first electromagnetic relay means, said first relay means comprising a first winding, a first armature, and a first biassing means, said first winding being adapted to be connected in series with said circuit and being adapted, when fully energised, to move said first armature to operated position in opposition to the action of said first biassing means, a second electromagnetic relay means, said second relay means comprising a second winding, a second armature, and a second biassing means, said second winding being adapted to be connected in parallel with said circuit and, when energised, to move said second armature to operated position in opposition to the action of said second biassing means, switch contacts adapted to be connected in series with said circuit, interlock means, and a third biassing means, said interlock means comprising an interlock bar and a lever member, said interlock bar being mounted upon said first armature and engaging with said second armature, to lock said second armature in operated position when the current in said first winding falls below a predetermined minimum value while, at the same time, the current in said second winding remains substantially at full value, said lever member abutting, at one end, against a cam surface formed on said second armature, said cam surface moving said lever member to operated position against the action of said third biassing means when said second winding is energised, said switch contacts comprising a first and a second pair of spring contacts, each of said pairs having a first and a second contact, said first contact of said first pair being mounted upon said first armature and contacting said second contact of said first pair when said first armature is in operated position, said first contact of said second pair being mounted upon said lever member and contacting said second contact of said second pair when said lever member is in unoperated position.

14. A device for effecting protection of an electric circuit comprising, in combination, a first electromagnetic relay means, said first relay means comprising a first winding and an armature, said first winding being adapted to be connected in series with said circuit and being adapted, when fully energised, to move said armature to operated position, a second electromagnetic relay means, said second relay means comprising a second winding adapted to be connected in parallel with said circuit and, when energised, to move said armature to unoperated position, switch contacts adapted to be connected in series with said circuit, said switch contacts comprising a mercury switch so mounted upon said armature that said switch is closed when said armature is in operated position, and interlock means, said interlock means comprising a trigger lock associated with said armature to lock the said armature when it moves to unoperated position.

CLIFFORD HIGGINS.